(12) United States Patent
Rueger et al.

(10) Patent No.: US 6,564,771 B2
(45) Date of Patent: May 20, 2003

(54) FUEL INJECTION SYSTEM FOR AN INTERNAL COMBUSTION ENGINE

(75) Inventors: Johannes-Jörg Rueger, Vaihingen/enz (DE); Josef Newald, Stuttgart (DE); Udo Schulz, Vaihingen/enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/896,633

(22) Filed: Jun. 29, 2001

(65) Prior Publication Data

US 2002/0046731 A1 Apr. 25, 2002

(30) Foreign Application Priority Data

Jul. 8, 2000 (DE) .......................................... 100 33 343

(51) Int. Cl.[7] .............................................. F02H 51/06
(52) U.S. Cl. ........................ 123/299; 123/472; 123/498
(58) Field of Search ................................. 123/472, 476, 123/490, 498, 299; 361/154; 310/316.03; 239/585.1, 585.4, 585.5

(56) References Cited

U.S. PATENT DOCUMENTS

| | | | |
|---|---|---|---|
| 4,688,536 A | * | 8/1987 | Mitsuyasu et al. ........... 123/446 |
| 4,732,129 A | * | 3/1988 | Takigawa et al. ........... 123/478 |
| 5,130,598 A | * | 7/1992 | Verheyen et al. ...... 310/316.03 |
| 5,402,760 A | | 4/1995 | Takeuchi et al. ............. 123/300 |
| 5,986,360 A | * | 11/1999 | Gerken et al. ............... 123/478 |
| 6,044,823 A | * | 4/2000 | Watanabe .................... 123/490 |
| 6,060,814 A | * | 5/2000 | Hoffmann et al. ...... 310/316.03 |
| 6,109,245 A | * | 8/2000 | Egger et al. ................. 123/490 |
| 6,212,053 B1 | * | 4/2001 | Hoffmann et al. .......... 361/115 |

FOREIGN PATENT DOCUMENTS

| | | |
|---|---|---|
| DE | 198 60 398 | 7/2000 |
| EP | 0 552 414 | 7/1993 |

* cited by examiner

Primary Examiner—Henry C. Yuen
Assistant Examiner—Hai Huynh
(74) Attorney, Agent, or Firm—Kenyon & Kenyon

(57) ABSTRACT

A fuel injection system for an internal combustion engine, in particular a diesel engine, having at least two cylinders, the fuel injection system having at least two actuator elements and at least one actuator element being assigned to each cylinder in order to inject fuel into the cylinder, and the fuel injection system having an injection control system for monitoring and/or resolving a conflict in triggering of the actuator elements.

43 Claims, 8 Drawing Sheets

FUEL INJECTION SYSTEM FOR AN INTERNAL COMBUSTION ENGINE

DESCRIPTION

Figure 1:
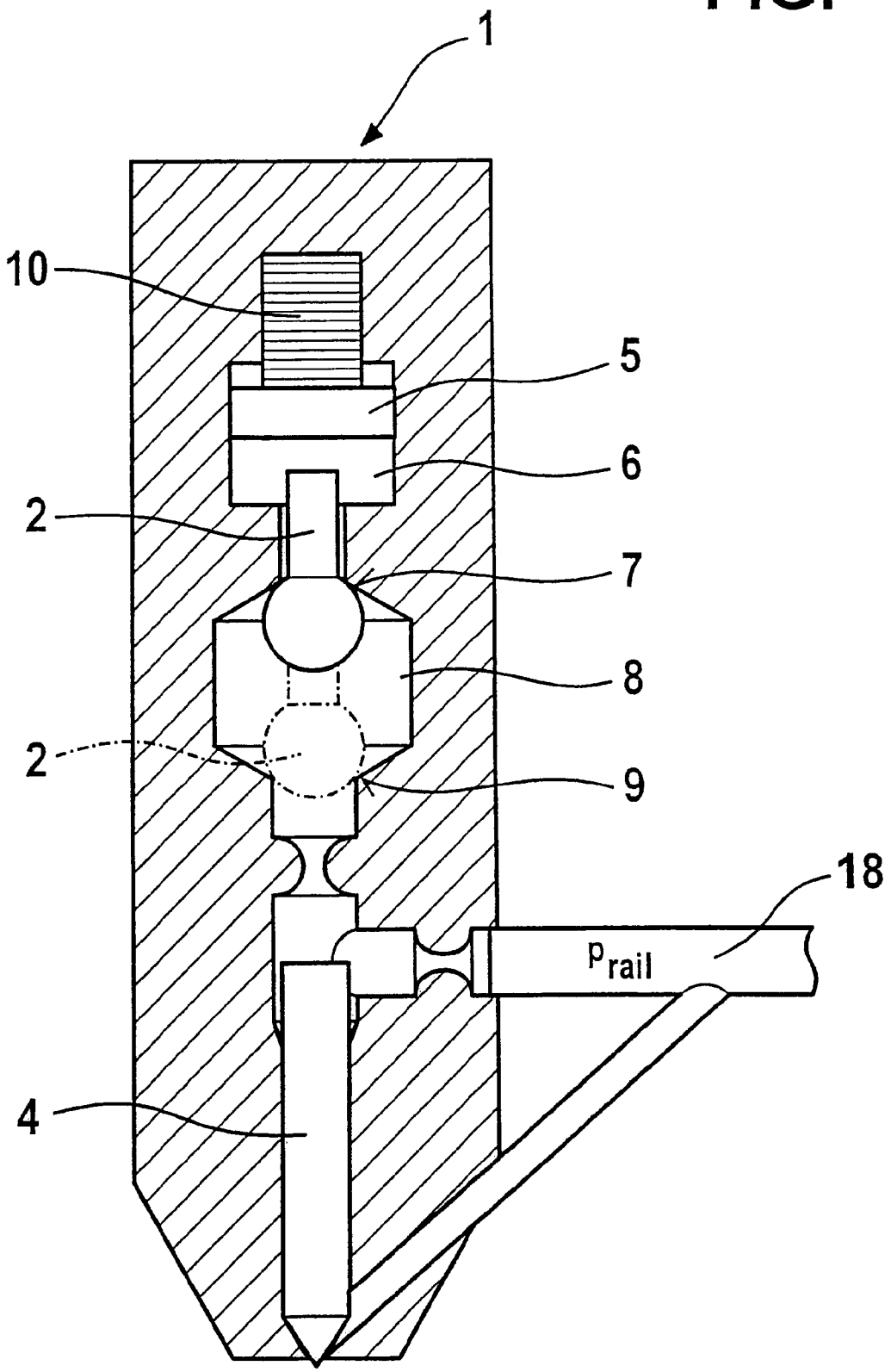

The present invention relates to a fuel injection system for an internal combustion engine, in particular a diesel engine, having at least two cylinders, the fuel injection system having at least two actuator elements and at least one actuator element being assigned to each cylinder in order to inject fuel into the cylinder. Furthermore, the present invention relates to a method for operating a fuel injection system of this kind.

The object of the present invention is to improve the injection behavior of a fuel injection system of this kind and to simplify a fuel injection system of this kind.

According to the present invention, this object is achieved via a fuel injection system for an internal combustion engine, in particular a diesel engine, having at least two cylinders, according to claim 1, and via a method according to claim 17. Herein, the fuel injection system has at least two actuator elements, at last one actuator element for injecting fuel into the system being assigned to each cylinder, and the fuel injection system having an injection control circuit to perform monitoring and/or to resolve conflicts in triggering of the actuator elements. The actuator elements are piezoelectric elements or solenoid valves.

Furthermore, according to the present invention, this object is achieved via a fuel injection system for an internal combustion engine, in particular a diesel engine, having at least two cylinders, according to claim 4 and via a method according to claim 18. Herein, the fuel injection system has at least two piezoelectric elements, at least one piezoelectric element for injecting fuel into the cylinder via charging or discharging of the piezoelectric element being assigned to each cylinder, the piezoelectric elements being essentially directly electrically connected to one another on at least one side, and the fuel injection system having an injection control system for monitoring whether one piezoelectric element is charged if the other piezoelectric element is to be charged or discharged. Herein, it is advantageous if both piezoelectric elements are arranged on one actuator bank.

Furthermore, according to the present invention, this object is achieved via a fuel injection system for an internal combustion engine, in particular a diesel engine, having at least two cylinders, the fuel injection system having at least two piezoelectric elements, and at least one piezoelectric element for injecting fuel into the cylinder via charging or discharging of the piezoelectric element being assigned to each cylinder, both piezoelectric elements being arranged on one actuator bank, and the fuel injection system having an injection control system for monitoring whether a piezoelectric element is charged if the other piezoelectric element is to be charged or discharged.

Furthermore, according to the present invention, this object is achieved via a fuel injection system for an internal combustion engine, in particular a diesel engine, having at least two cylinders, according to claim 5 and via a method according to claim 19. Herein, the fuel injection system has at least two piezoelectric elements, at least one piezoelectric element for injecting fuel into the cylinder via charging or discharging of the piezoelectric element being assigned to each cylinder, a single supply unit for charging or discharging the piezoelectric element being assigned to the piezoelectric elements, and the fuel injection system having an injection control system for monitoring possible overlap of a time interval during which one piezoelectric element is to be charged or discharged with a time interval during which the other piezoelectric element is to be charged or discharged. Herein, it is advantageous if the two piezoelectric elements are arranged on different actuator banks. According to an advantageous embodiment of the present invention, the injection control system also monitors whether one piezoelectric element is charged if the other piezoelectric element is to be charged or discharged if piezoelectric elements are arranged on one actuator bank or the piezoelectric elements are essentially directly electrically connected to one another on at least one side.

Furthermore, according to the present invention, this object is achieved via a fuel injection system for an internal combustion engine, in particular a diesel engine, having at least two cylinders, the fuel injection system having at least two piezoelectric elements and at least one piezoelectric element for injecting fuel into the cylinder via charging or discharging of the piezoelectric element being assigned to each cylinder, the two piezoelectric elements being arranged on different actuator banks and the fuel injection system having an injection control circuit for monitoring possible overlap of a time interval during which one piezoelectric element is to be charged or discharged with a time interval during which the other piezoelectric element is to be charged or discharged. According to an advantageous embodiment of the present invention, the injection control system also monitors whether one piezoelectric element is charged if the other piezoelectric element is to be charged or discharged if piezoelectric elements are arranged on one actuator bank or the piezoelectric elements are essentially directly electrically connected to one another on at least one side.

According to a further advantageous embodiment of the present invention, injection of fuel in a given injection cycle is carried out via at least two injections, different priorities being assigned to the at least two injections.

According to a further advantageous embodiment of the present invention, injection of fuel is carried out via one main injection and at least one pilot injection prior to the main injection, more fuel being injected into the cylinder via the main injection than via the pilot injection, and the main injection being assigned higher priority than the pilot injection.

According to a further advantageous embodiment of the present invention, injection of fuel is carried out via one main injection and two pilot injections prior to the main injection, namely an earlier and a later pilot injection, one pilot injection being assigned higher priority than the other pilot injection, and it being possible for these priorities to be dependent on the operating point.

According to a further advantageous embodiment of the present invention, injection of the fuel is carried out via at least one main injection and one secondary injection following the main injection, more fuel being injected into the cylinder via the main injection than via the secondary injection, and higher priority being assigned to the main injection than to the secondary injection.

According to a further advantageous embodiment of the present invention, the priorities of the pilot injections and secondary injections are assigned based on the operating point.

According to a further advantageous embodiment of the present invention, the injection having the lower priority is shortened or shifted to such an extent that one piezoelectric element is not charged if the other piezoelectric element is to be charged or discharged. It is advantageous that this is only carried out if both piezoelectric elements are assigned to one actuator bank or if the piezoelectric elements are at least essentially directly electrically connected on at least one side.

If the actuator elements are embodied as solenoid valves, it is advantageous if the injection having the lower priority is shortened to such an extent that no current flows through one solenoid valve if current is flowing through the other solenoid valve.

Shortening of the injection having lower priority also includes shortening to 0, i.e., elimination of the injection if this is necessary.

According to a further advantageous embodiment of the present invention, the injection having the lower priority is shifted to such an extent that the time interval during which a piezoelectric element is to be charged or discharged does not overlap with the time interval during which the other piezoelectric element is to be charged or discharged. It is advantageous that this is only carried out if the two piezoelectric elements are assigned to different actuator banks and if a single supply unit for charging or discharging is assigned to both piezoelectric elements.

According to a further advantageous embodiment of the present invention, the injection having the lower priority is delayed to such an extent that the time interval during which one piezoelectric element is to be charged or discharged does not overlap with the time interval during which the other piezoelectric element is to be charged or discharged. It is advantageous that this is only carried out if the two piezoelectric elements are parts of different actuator banks and a single supply unit for charging and discharging is assigned to both piezoelectric elements.

According to a further advantageous embodiment of the present invention, the injection having the lower priority is shortened to such an extent that the time interval during which one piezoelectric element is to be charged or discharged does not overlap the time interval during which the other piezoelectric element is to be charged or discharged. It is useful that this only happens if both piezoelectric elements are parts of different actuator banks and a single supply unit for charging or discharging is assigned to both piezoelectric elements.

According to a further advantageous embodiment of the present invention, the earlier pilot injection is delayed by the same amount of time as the later pilot injection.

Further advantages and details are set forth in the description of exemplary embodiments below:

The figures show the following:

FIG. 1: Schematic drawing of a fuel injection system.

Figure 2:
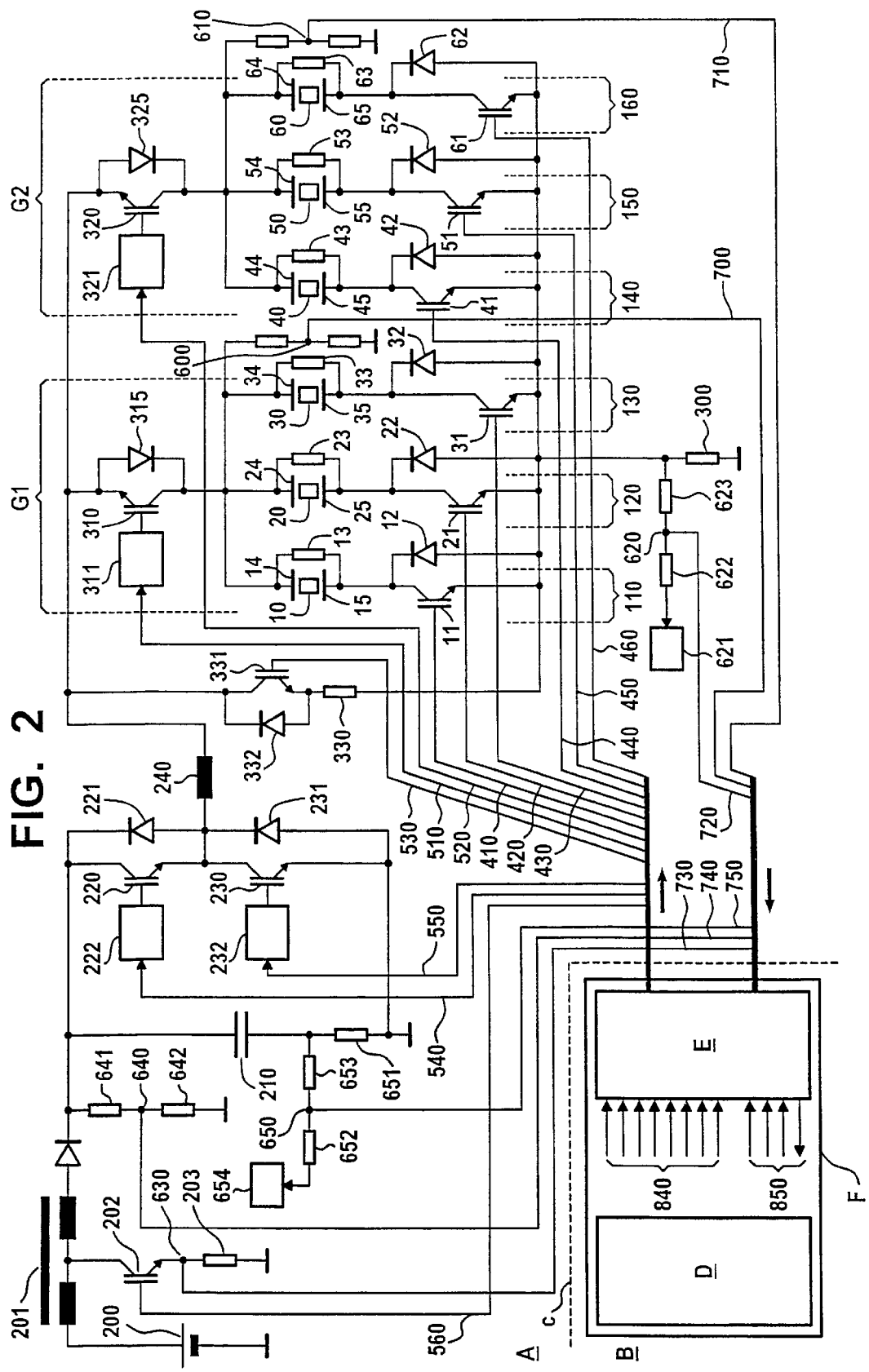

FIG. 2: Interconnection of piezoelectric elements.

Figure 3A:
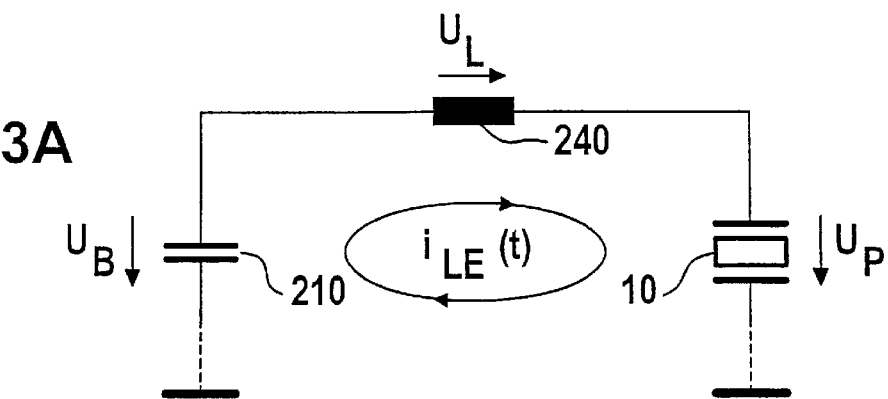

FIG. 3A: Charging of a piezoelectric element.

Figure 3B:
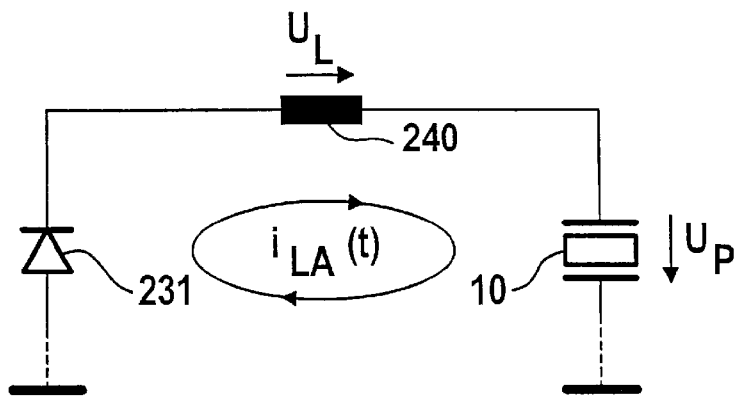

FIG. 3B: Charging of a piezoelectric element.

Figure 3C:
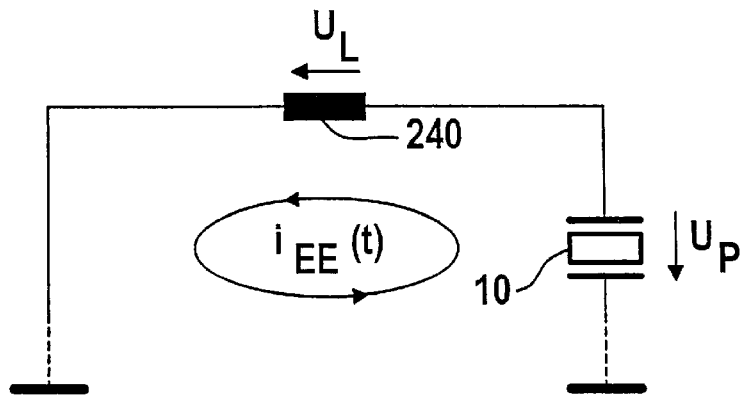

FIG. 3C: Discharging of a piezoelectric element.

Figure 3D:
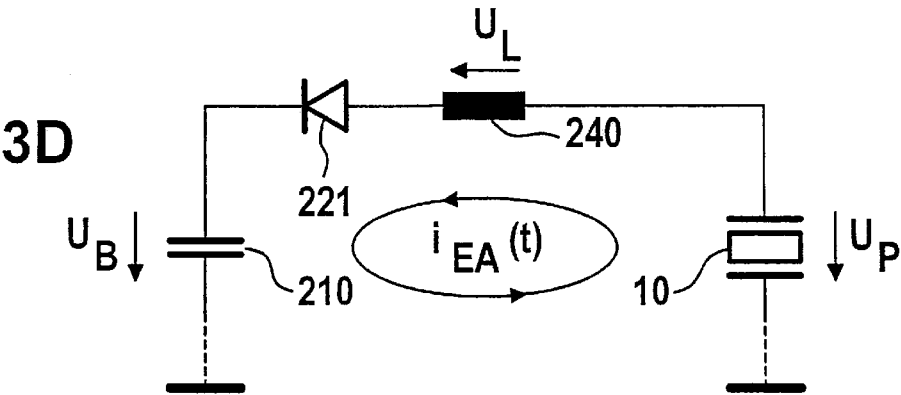

FIG. 3D: Discharging of a piezoelectric element.

Figure 4:
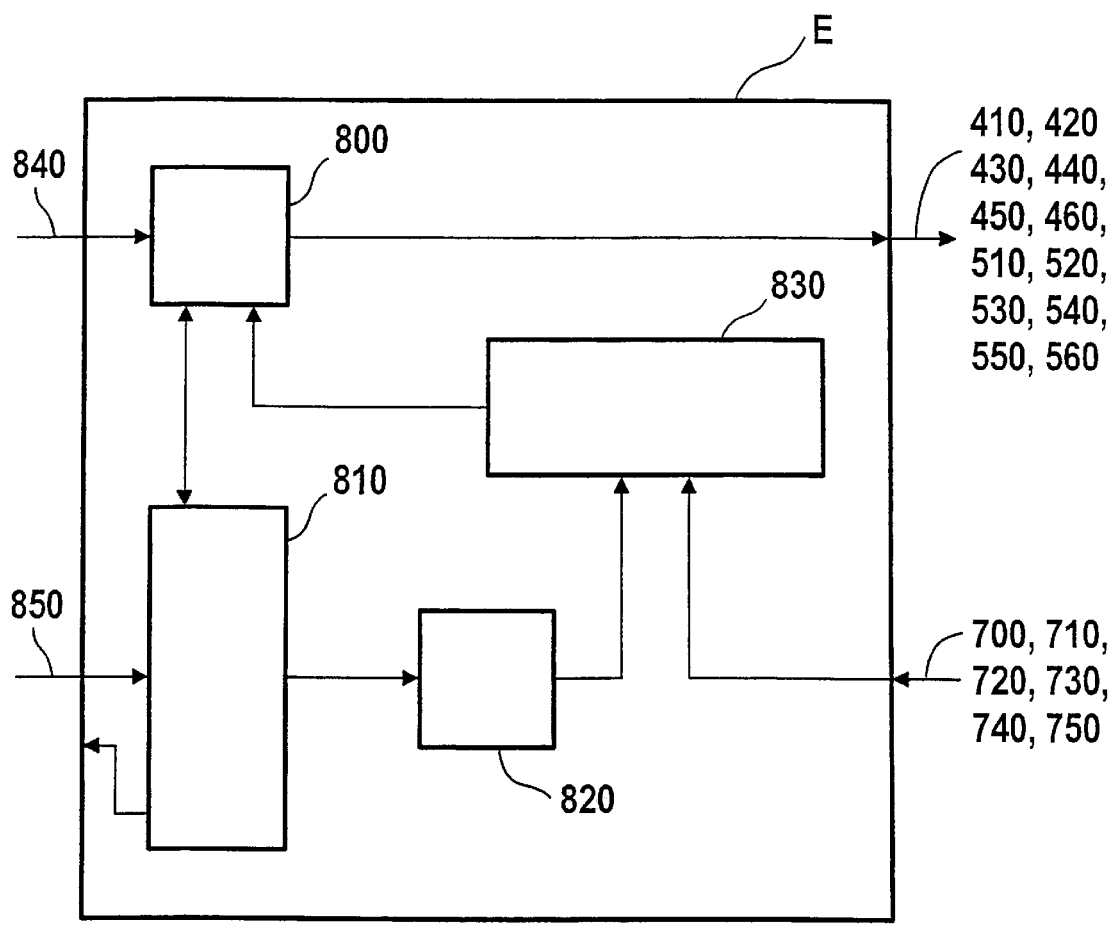

FIG. 4: Trigger IC.

Figure 5:
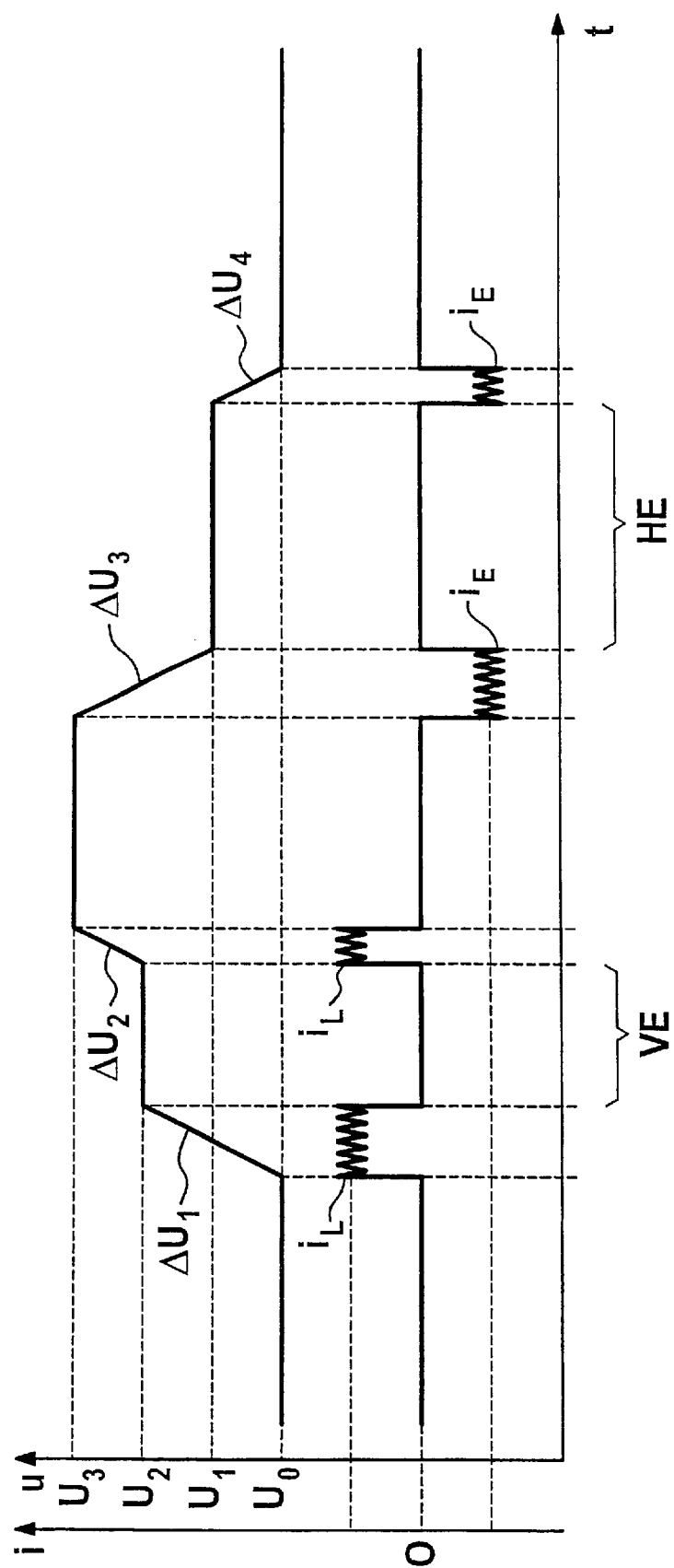

FIG. 5: Voltage across a piezoelectric element, plotted against time.

Figure 6:
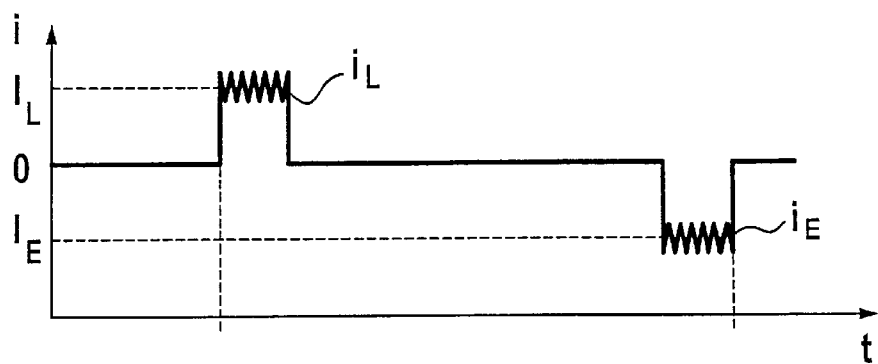

FIG. 6: Current flow through a piezoelectric element.

Figure 7:
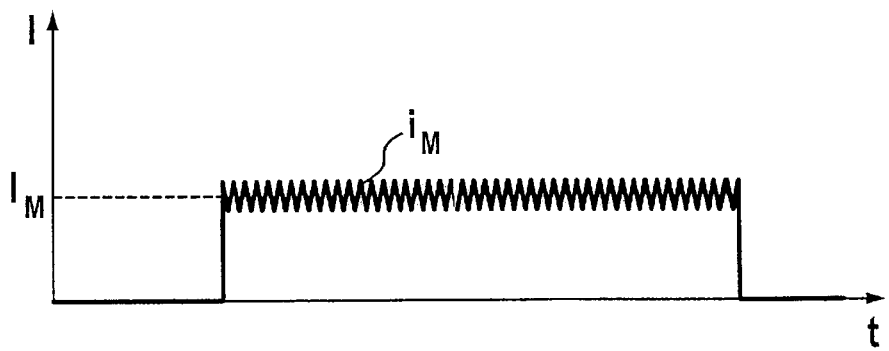

FIG. 7: Current flow through a solenoid valve.

Figure 8:
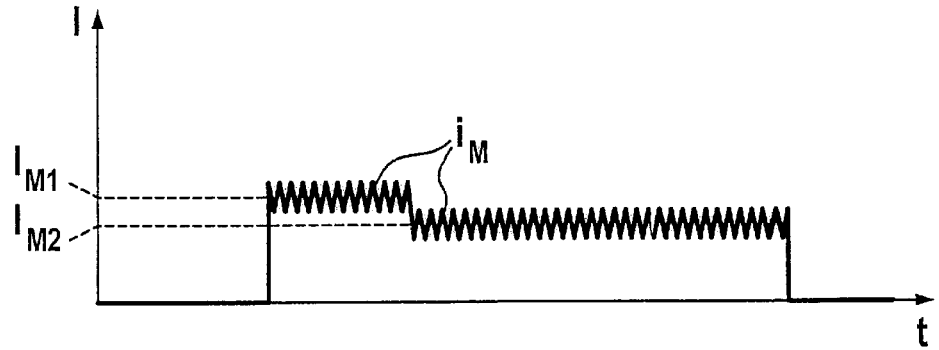

FIG. 8: Current flow through a solenoid valve.

Figure 9:
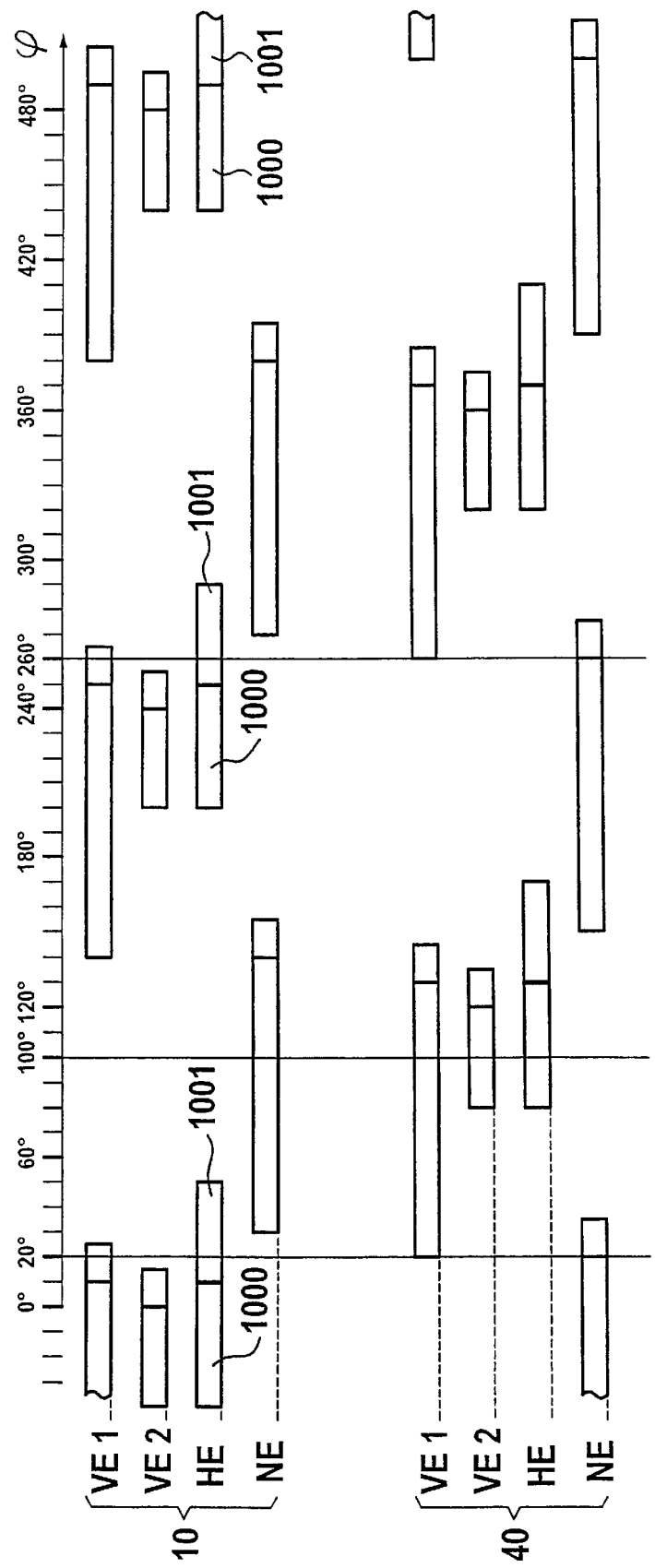

FIG. 9: Ranges of possible starts of injection, with appended maximum normal injection duration FIG. 10: Flow chart for conflict management.

FIG. 1 shows a schematic drawing of a fuel injection system having piezoelectric element 10 as an actuator. With regard to FIG. 1, piezoelectric element 10 is subjected to electrical triggering so that it expands and contracts at a given (trigger) voltage U. Piezoelectric element 10 is coupled to plunger 5. In its expanded state, piezoelectric element 10 causes plunger 5 to protrude into hydraulic adapter 6, which contains a hydraulic fluid, e.g., fuel. As a result of the expansion of piezoelectric element 10, (dual-action) control valve 2 is hydraulically pushed away from hydraulic adapter 6 and moved away from first closed position 7. The combination of the (dual-action) control valve 2 and hollow bore 8 is often referred to as a dual-action double-seat valve. Control valve 2 is in its second closed position 9 if piezoelectric element 10 is fully expanded. In FIG. 1, the latter position of control valve 2 is schematically shown using phantom lines.

The fuel injection system includes injection needle 4, which allows fuel to be injected from fuel pressure line 18 into the cylinder (not shown). If piezoelectric element 10 is in its non-excited state, control valve 2 rests in its first closed position 7, and if piezoelectric element 10 is completely expanded, control valve 2 rests in its second closed position 9. In both instances, injection needle 4 is held in closed position by hydraulic pressure $P_{rail}$ in fuel line 18. As a result, the fuel mixture does not enter the cylinder (not shown). Vice versa, the pressure in fuel pressure line 18 drops if piezoelectric element 10 is excited so that dual-action control valve 2 is in its middle position with respect to hollow bore 8. In fuel pressure line 18, the drop in pressure results in a pressure difference between the upper end and the lower end of injection needle 4 so that injection needle 4 lifts and fuel can be injected into the cylinder (not shown).

FIG. 2 shows piezoelectric elements 10, 20, 30, 40, 50, 60 and means for triggering them. Herein, A is an area shown in detail, and B is an area not shown in detail; they are separated by broken line c. Area A, which is shown in detail, includes a circuit for charging and discharging piezoelectric elements 10, 20, 30, 40, 50, 60. In the example shown, piezoelectric elements 10, 20, 30, 40, 50, 60 are actuators in fuel injectors (in particular in common rail injectors) of an internal combustion engine. In the type of embodiment described, six piezoelectric elements 10, 20, 30, 40, 50, 60 are used for independently controlling six cylinders in an internal combustion engine; for other purposes, it would be feasible to use any other number of piezoelectric elements.

Area B, which is not shown in detail, includes injection control system F having control device D and trigger IC E used to control the elements within area A, which is shown in detail. Various voltage and current measured values from all of the rest of the triggering circuit of the piezoelectric element are sent to trigger IC E. According to the present invention, control processor D and trigger IC E are designed to control the triggering voltages and triggering times for the piezoelectric element. Furthermore, control processor D and/or trigger IC E are designed to monitor various voltages and currents in the entire circuit of the piezoelectric element In the description below, we first describe the individual elements within area A, which is shown in detail. After that, we provide a general description of the sequences of charging and discharging piezoelectric elements 10, 20, 30, 40, 50, 60. After that, we describe in detail how both sequences are controlled and monitored by control processor D and trigger IC E.

Piezoelectric elements 10, 20, 30, 40, 50, 60 are divided up into first group G1 and second group G2, each of which include three piezoelectric elements (piezoelectric elements 10, 20, 30 in first group G1 and piezoelectric elements 40, 50, 60 in group G2). Groups G1 and G2 are components of circuit parts that are connected in parallel. Using group select switches 310, 320, it is possible to specify which of the groups G1 (piezoelectric elements 10, 20, 30) and G2 (piezoelectric elements 40, 50, 60) is discharged via a joint charge/discharge device. As described in greater detail below, group select switches 310, 320 are of no significance to charge sequences. Piezoelectric elements 10, 20, 30 of first group G1 are arranged on one actuator bank, and piezoelectric elements 40, 50, 60 of group G2 are arranged on another actuator bank. Herein, an actuator bank is considered a block on which two or more actuator elements, in particular piezoelectric elements, are immovably fixed, e.g., encapsulated.

Group select switches 310, 320 are arranged between coil 240 and groups G1 and G2 respectively (the coil-side connectors thereof) and are embodied as transistors. Drivers 311, 321, which convert control signals received from trigger IC E into voltages, and which can be selected as required in order to close and open the switches, are provided.

Diodes 315 and 325 are arranged in parallel with group select switches 310, 320 and are designated group select diodes. If group select switches 310, 320 are embodied as MOSFETs or IGBTs, these group select diodes 315 and 325 may, for example, be embodied as the parasitic diodes. During charge sequences, group select switches 310, 320 are bridged by diodes 315, 325. Thus the functionality of group select switches 310, 320 is limited to simply selecting group G1 (piezoelectric elements 10, 20, 30) or G2 (piezoelectric elements 40, 50, 60) for a discharge procedure only.

Within groups G1 and G2, piezoelectric elements 10, 20, 30 and, respectively, 40, 50, 60 are arranged as components of piezobranches 110, 120, 130 (group G1) and 140, 150, 160 (group G2), which are connected in parallel. Each piezobranch includes a series circuit, which includes a first parallel circuit having a piezoelectric element 10, 20, 30, 40, 50, 60 and a resistor 13, 23, 33, 43, 53, 63 (designated a branch resistor) and a second parallel circuit having a select switch (designated a branch select switch) embodied as transistor 11, 21, 31, 41, 51, 61 and a diode 12, 22, 32, 42, 52, 62 (designated a branch diode).

Branch resistors 13, 23, 33, 43, 53, 63 cause the piezoelectric element 10, 20, 30, 40, 50, 60 in question to discharge continuously during and after a charge sequence, as they connect both terminals of the capacitive piezoelectric elements 10, 20, 30, 40, 50, 60 in question. However, branch resistors 13, 23, 33, 43, 53, 63 are of sufficient size to ensure that this sequence is carried out slowly as compared with the controlled charge and discharge sequences, as described below. Therefore the charge of any piezoelectric element 10, 20, 30, 40, 50, 60 within a relevant time period following a charge sequence may be considered constant.

The branch select switches/branch diode pairs in individual piezobranches 110, 120, 130, 140, 150, 160, i.e., select switch 11 and diode 12 in piezobranch 110, select switch 21 and diode 22 in piezobranch, 120 etc., may be implemented as electronic switches, i.e., transistors, having parasitic diodes, e.g., MOSFETs or IGBTs (as indicated above for group select switches/diode pairs 310 and 315 and, respectively, 320 and 325).

Using branch select switches 11, 21, 31, 41, 51, 61 it is possible to specify which of piezoelectric elements 10, 20, 30, 40, 50, 60 are charged via a joint charge/discharge device: All piezoelectric elements 10, 20, 30, 40, 50, 60 whose branch select switches 11, 21, 31, 41, 51, 61 are closed during the charge procedure described below are charged. Normally, it is always the case that just one of the branch select switches is closed.

Branch diodes 12, 22, 32, 42, 52, 62 are used to bridge branch select switches 11, 21, 31, 41, 51, 61 during discharge sequences. Thus in the example shown each individual piezoelectric element can be selected, whereas in discharge sequences either first group G1 (piezoelectric elements 10, 20, 30) or second group G2 (piezoelectric elements 40, 50, 60) or both must be selected.

As for piezoelectric elements 10, 20, 30, 40, 50, 60 themselves, branch select piezoterminals 15, 25, 35, 45, 55, 65 may be connected to ground, either via branch select switches 11, 21, 31, 41, 51, 61 or via corresponding diodes 12, 22, 32, 42, 52 and 62 and additionally, in both cases, via resistor 300.

The currents flowing between branch select piezoterminals 15, 25, 35, 45, 55, 65 and ground during charging and discharging of piezoelectric elements 10, 20, 30, 40, 50, 60 are measured using resistor 300. Knowing these currents ensures that charging and discharging of piezoelectric elements 10, 20, 30, 40, 50, 60 can be controlled. In particular, by closing and opening charge switch 220 and discharge switch 230 based on the absolute current values, it is possible to set the charge current and discharge current to predefined mean values and/or to keep them from exceeding or falling below predefined maxima or minima.

In the example shown, further voltage source 621, which supplies a voltage of, for example, 5 V DC, and a voltage divider in the form of two resistors 622 and 623, are required. This protects trigger IC E, which carries out the measurements, against negative voltages, which might otherwise arise at measuring point 620 and which cannot be controlled by trigger IC E. Negative voltages of this kind are modified via addition to a positive voltage arrangement supplied by aforementioned voltage source 621 and voltage divider resistors 622 and 623.

The other terminal of each of piezoelectric elements 10, 20, 30, 40, 50, 60 in question, i.e., the group select piezoterminal 14, 24, 34, 44, 54, 64 in question, can be connected to the positive pole of a voltage source via group select switch 310 or 320 or via group select diode 315 or 325 and via coil 240 and a parallel circuit that includes charge switch 220 and charge diode 221, or alternatively or additionally connected to ground via group select switch 310 or 320 or via diode 315 or 325 and via coil 240 and a parallel circuit that includes discharge switch 230 and discharge diode 231. Charge switch 220 and discharge switch 230 are implemented as, for example, transistors, which are triggered via driver 222 or 232.

The voltage source includes capacitor 210. Capacitor 210 is charged by battery 200 (for example a motor vehicle battery) and by DC converter 201. DC converter 201 converts the battery voltage (for example 12 V) into essentially any other DC voltage, for example 250 V, and charges capacitor 210 to this voltage. DC converter 201 is controlled via transistor switch 202 and resistor 203, which is used to measure the currents tapped at measuring point 630.

For the purposes of cross-checking, a further voltage measurement can be taken at measuring point 650 by trigger IC E and resistors 651, 652, 653 and, for example 5-V DC voltage source 654; furthermore, a voltage measurement may also be taken at measuring point 640 by trigger IC E and voltage-splitting resistor 641 and 642.

Resistor 330 (designated a total discharge resistor), switch 331 (designated a stop switch) and diode 332 (designated a total discharge diode) are used to discharge piezoelectric elements 10, 20, 30, 40, 50, 60 if, outside normal operation, as described below, they are not discharged via the "normal" discharge sequence. Stop switch 331 is preferably closed after "normal" discharge sequences (cyclical discharging via discharge switch 230) and thus connects piezoelectric elements 10, 20, 30, 40, 50, 60 to ground via resistors 330 and 300.

Thus any residual voltages left in piezoelectric elements 10, 20, 30, 40, 50, 60 are eliminated. Total discharge diode 332 prevents negative voltages from arising at piezoelectric elements 10, 20, 30, 40, 50, 60, which under certain circumstances could be damaged by negative voltages.

Charging and discharging of all piezoelectric elements 10, 20, 30, 40, 50, 60 or of a specific piezoelectric element 10, 20, 30, 40, 50, 60 is carried out via a single charge/discharge device which is used jointly for all groups and their piezoelectric elements. In the example shown, the joint charge/discharge device includes battery 200, DC voltage converter 201, capacitor 210, charge switch 220 and discharge switch 230, charge diode 221 and discharge diode 231, and coil 240.

Charging and discharging is carried out in the same way for each piezoelectric element, and below we only describe it with reference to first piezoelectric element 10.

The states that arise during the charge and discharge procedures are explained with reference to FIGS. 3A to 3D; FIGS. 3A and 3B relate to charging of piezoelectric element 10, and FIGS. 3C and 3D relate to discharging of piezoelectric element 10.

Control of the selection of one or a plurality of piezoelectric elements 10, 20, 30, 40, 50, 60 to be charged or discharged, the charge sequence described below, and the discharge sequence are carried out via trigger IC E and control device D via opening and, respectively, closing of one or a plurality of the aforementioned switches 11, 21, 31, 41, 51, 61; 310, 320; 220, 230, 331. The interactions between the elements within area A, which is shown in detail, and within trigger IC E and control processor, are described in greater detail below.

With regard to the charge sequence, first a piezoelectric element 10, 20, 30, 40, 50, 60 to be charged must be selected. In order to charge just first piezoelectric element 10, branch select switch 11 of first branch 110 is closed, and all other branch select switches 21, 31, 41, 51, 61 remain open. In order to charge any one of the other piezoelectric elements 10, 20, 30, 40, 50, 60 only, or to charge a plurality simultaneously, selection would be carried out by closing the corresponding branch select switches 21, 31, 41, 51, and/or 61.

The charge sequence itself can then be carried out:

In the example shown, as a general rule a positive potential difference between capacitor 210 and group select piezoterminal 14 of piezoelectric element 10 is necessary. As long as charge switch 220 and discharge switch 230 are open, piezoelectric element 10 is not charged or discharged. In this status, the circuit shown in FIG. 2 is in stationary status, i.e., piezoelectric element 10 essentially retains its charge status, no currents flowing.

To charge first piezoelectric element 10, switch 220 is closed. Theoretically, it would be possible to thereby charge just piezoelectric element 10. However, this would result in substantial currents, which could damage the elements in question. Therefore the currents that arise are measured at measuring point 620 and switch 220 is reopened as soon as the currents detected exceed a specific boundary value. In order to achieve a charge as desired on first piezoelectric element 10, charge switch 220 is closed and opened repeatedly, while discharge switch 230 remains open.

Upon closer examination, one can see that if charge switch 220 is closed, the situation shown in FIG. 3A arises, i.e., a closed circuit that includes a series circuit having piezoelectric element 10, capacitor 210 and coil 240, current $i_{LE}$ (t) flowing in the circuit, as shown by the arrows in FIG. 3A, arises. Due to this current flow, positive charges are transferred to group select piezoterminal 14 of first piezoelectric element 10 and power is stored in coil 240.

If charge switch 220 opens briefly, e.g., for a few µs following closing, the situation shown in FIG. 3B arises: A closed circuit that includes a series circuit that includes piezoelectric element 10, discharge diode 231, and coil 240, current $i_{LA}$ (t) flowing in the circuit as shown by the arrows in FIG. 3B, arises. Due to this current flow, the energy stored in coil 240 flows into piezoelectric element 10. Based on the energy flow to piezoelectric element 10, the voltage across it increases and thus its exterior dimensions increase. Once energy has been transferred from coil 240 to piezoelectric element 10, the stationary status of the circuit shown in FIG. 2, which we described earlier, is achieved once again.

At this instant, or earlier or later, depending on the desired time profile of the charge sequence, charge switch 220 is once again closed and reopened so that the sequences described above are carried out once again. Because charge switch 220 is closed and reopened once again, the energy stored in piezoelectric element 10 increases (the energy already stored in piezoelectric element 10 and the energy newly transferred to it are added to one another), and the voltage across piezoelectric element 10 also increases and its exterior dimensions increase accordingly.

If the aforementioned closing and opening of charge switch 220 is repeated a plurality of times, the voltage that arises at piezoelectric element 10 can increase and piezoelectric element 10 can expand in a step-by-step manner.

If charge switch 220 has been closed and opened a predefined number of times and/or piezoelectric element 10 has reached the desired charge status, charging of the piezoelectric element via leaving charge switch 220 open is ended.

With regard to the discharge sequence, in the example shown piezoelectric elements 10, 20, 30, 40, 50, 60 are discharged in groups (G1 and/or G2) as described below:

First, group select switch 310 and/or 320 of group G1 and/or G2 whose piezoelectric elements are to be discharged, are closed (branch select switches 11, 21, 31, 41, 51, 61 have no influence on selection of piezoelectric elements 10, 20, 30, 40, 50, 60 for the discharge procedure, as in this case they are bridged by diodes 12, 22, 32, 42, 52, 62). Therefore in order to discharge piezoelectric element 10, which is part of first group G1, group select switch 310 is closed.

If discharge switch 230 is closed, the situation shown in FIG. 3C arises: A closed circuit that includes a series circuit having piezoelectric element 10, coil 240, current 1 (t) flowing in the circuit as shown by the arrows in FIG. 3C, arises. Due to this current flow, energy (or part thereof) stored in the piezoelectric element is transferred to coil 240. Based on the amount of energy transferred from piezoelectric element 10 to coil 240, the voltage across piezoelectric element 10 falls, and the exterior dimensions thereof decrease.

If discharge switch 230 opens briefly (e.g., for a few μs) following closing, the situation shown in FIG. 3D arises: A closed circuit that includes a series circuit having piezoelectric element 10, capacitor 210, charge diode 221 and coil 240, current $i_{EA}$ (t) flowing in the circuit as shown by the arrows in FIG. 3D, arises. Due to this current flow, the energy stored in coil 240 is transferred back to capacitor 210. Once energy has been transferred from coil 240 into capacitor 210, the stationary status of the circuit, which has already been described and is shown in FIG. 2, is achieved once again.

At this instant, or earlier or later depending on the desired time profile of the discharge procedure, discharge switch 230 is closed once again and reopened so that the sequences described above are carried out once again. Because discharge switch 230 is closed and reopened once again, the energy stored in piezoelectric element 10 decreases further and the voltage that arises across the piezoelectric element and the exterior dimensions thereof also decrease accordingly.

If the aforementioned closing and opening of discharge switch 230 is repeated a plurality of times, the voltage across piezoelectric element 10 and the expansion of piezoelectric element 10 decrease out in a step-by-step manner.

If discharge switch 230 has been closed and opened a predefined number of times, and/or the piezoelectric element has reached the desired charge status, discharging of the piezoelectric element via leaving discharge switch 230 open is ended.

The interaction between trigger IC E and control processor D and the elements within area A, which is shown in detail, is carried out via control signals, which are supplied from trigger IC E to elements within area A (which is shown in detail) via branch select control lines 410, 420, 430, 440, 450, 460, group select control lines 510, 520, stop switch control line 530, charge switch control line 540 and discharge switch control line 550, and control line 560. Furthermore, sensor signals, which are supplied to trigger IC E via sensor lines, 700, 710, 720, 730, 740, 750, are obtained at measuring points 600, 610, 620, 630, 640, 650 within area A, which is shown in detail.

In order to select piezoelectric elements 10, 20, 30, 40, 50, 60 for carrying out charge or discharge sequences for one or a plurality of piezoelectric elements 10, 20, 30, 40, 50, 60 via opening and closing of the corresponding switches as described above, voltages are applied or, respectively, not applied to the transistor bases via the control lines. In particular, the sensor signals are used to determine the voltage across piezoelectric elements 10, 20, 30 and 40, 50, 60 via measuring points 600 and 610 and to determine the charge and discharge currents via measuring point 620.

FIG. 4 shows some of the components in trigger IC E: Logic circuit 800, memory 810, digital-analog converter module 820, and comparator module 830. Furthermore, the figure shows that fast parallel bus 840, which is used for control signals, is connected to logic circuit 800 of trigger IC E, while slower serial bus 850 is connected to memory 810. Logic circuit 800 is connected to memory 810, comparator module 830, and signal lines 410, 420, 430, 440, 450, 460; 510 and 520; and 530, 540, 550, 560. Memory 810 is connected to logic circuit 800 and digital-analog converter module 820. Furthermore, digital-analog converter module 820 is connected to comparator module 830. Furthermore, comparator module 830 is connected to sensor lines 700 and 710, 720, 730, 740, 750 and, as already mentioned, to logic circuit 800.

FIG. 5 shows voltage u at piezoelectric element 10 plotted against time t and current i flowing in piezoelectric element 10 plotted against time t. During the period when voltage $U_0$ is present across piezoelectric element 10, control valve 2 is in first closed position 7. Piezoelectric element 10 is charged to voltage $U_2$ via charge current $i_L$ which flows into the piezoelectric element. This voltage causes control valve 2 to move into a middle position between first closed position 7 and second closed position 9. As a result, injection needle 4 is moved upwards and fuel is injected into the cylinder. Piezoelectric element 10 is charged to voltage $U_3$ via further charging of piezoelectric element 10 via charge current $i_L$. As a result, valve 3 is moved to second closed position 9. As a result, injector 4 is moved downwards and injection of fuel into the cylinder ends. Piezoelectric element 10 is discharged to voltage $U_1$ via discharging of piezoelectric element 10 via discharge current $i_E$. As a result, control valve 2 is moved from second closed position 9 into the middle position between first closed position 7 and second closed position 9. As a result, injector 4 is moved upwards and fuel is injected into the cylinder. Control valve 2 is moved into first closed position 7 via further discharging of piezoelectric element 10 to voltage $U_0$ via discharge current $i_E$. As a result, injection needle 4 is moved downwards and injection of fuel into the cylinder ends. The injection cycle shown includes two injections, pilot injection VE and main injection HE. It is also feasible, for example, for the injection cycle to include four injections, two pilot injections VE1 and VE2, main injection HE, and secondary injection NE. In this case, voltages $U_1, U_2, U_3$ are reached, for example, twice per injection cycle. Alternatively, different voltages may be used for the additional injection.

FIGS. 6, 7, and 8 show the difference between the current flow into a piezoelectric element and the current flow through a solenoid valve. Herein, FIG. 6 shows the current flow for an injection system having an open position and (only) one closed position, the system being triggered by a piezoelectric element. Herein, at the beginning of injection, charge current $i_L$ flows, and at the end of injection discharge current $i_E$ flows. No current flows between flowing of charge current $i_L$ and flowing of discharge $i_E$, i.e., during injection.

By contrast, FIGS. 7 and 8 show that in the case of a solenoid valve, current $i_M$ flows during the entire duration of injection. Herein, it is possible to arrange that current $i_M$ through the solenoid valve fluctuates around constant mean value $i_M$ as shown in FIG. 7, or that current $i_M$ through the solenoid valve initially fluctuates around mean value $i_{M1}$ and then around mean value $i_{M2}$ as shown in FIG. 8.

FIG. 9 shows the ranges of possible starts of injection with appended maximum normal injection duration for piezoelectric element 10 and piezoelectric element 40. For the purposes of this example, reference numbers 1000 and 1001 are used. Herein, reference number 1000 indicates the range for the possible start of the main injection, and reference number 1001 indicates the possible duration of the main injection into the cylinder, which is triggered via piezoelectric element 10. Two pilot injections VE1 and VE2, main injection HE, and secondary injection NE are provided. The instants of the possible start of injection and the appended maximum possible injection duration are plotted with reference to crankshaft angle φ. As FIG. 9 shows, conflicts in triggering of piezoelectric elements 10 and 40 may arise, for example at 20°, 100° and 260°. Furthermore, it is clear that conflicts in triggering of the piezoelectric elements may arise if the piezoelectric elements are arranged on the same actuator bank.

The conflict situations described can be resolved in an advantageous manner by assigning different priorities to the injections. Herein, a main injection HE has higher priority than a pilot injection VE and a secondary injection NE. As a general rule, a pilot injection VE has a higher priority than a secondary injection NE. If there are two pilot injections VE1 and VE2, pilot injection VE1 has a different priority from that of the other pilot injection VE2. If there is a conflict between two injections, according to a useful embodiment, the injection having the lower priority is shifted. In the example shown in FIG. 9, for example, in the case of a conflict between pilot injection VE1 for the cylinder that is triggered by piezoelectric element 10 and the secondary injection for the cylinder that is triggered via piezoelectric element 40, secondary injection NE for the cylinder that is triggered via piezoelectric element 40 would be shifted. If an injection is shifted, the injection duration is, as far as possible, left unchanged. If necessary, the injection duration can be shortened, but not lengthened. In the case of shifting, it is advantageous that the start of injection is not moved to an earlier instant but rather only delayed. In the case of delaying of pilot injection VE2, it is advantageous to also shift pilot injection VE1. Herein, it is useful if pilot injection VE1 is shifted in such a way that the relative spacing in time of pilot injections VE1, VE2 and main injection HE remains unchanged.

If there is a conflict in triggering of piezoelectric elements on one actuator bank or if there is a conflict in triggering of solenoid valves, it is advantageous to shift the injection having the lower priority. Herein, it is possible to arrange that in such cases an error message is stored. If conflicts occur frequently, it is advantageous as a general rule to store corresponding error messages in an error memory.

Figure 10:
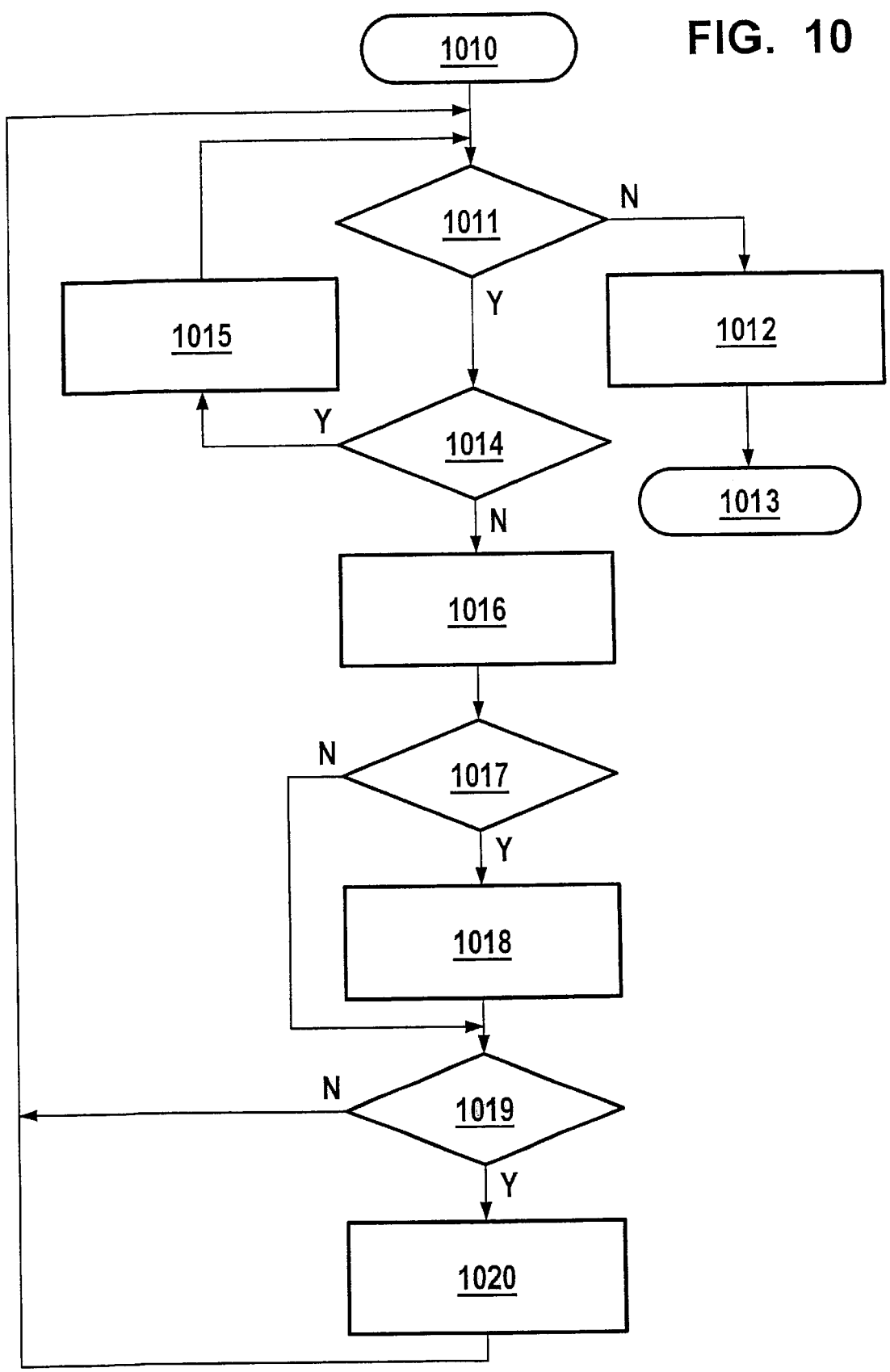

FIG. 10 shows an advantageous exemplary embodiment of a flow chart that carries out conflict management of this kind. It is advantageous if a flow chart of this kind is implemented on injection control system F, in particular on control processor D. Herein, reference number 1010 denotes the start of the flow chart. The flow chart begins with query 1011, in which a check is performed to determine whether there is a conflict between injections of various piezoelectric elements. If there is no conflict, processing moves to step 1012, in which an appropriate injection is carried out. Processing then comes to an end. Reference number 1013 denotes the end of processing. If there is a conflict, query 1011 is followed by query 1014, in which a check is performed to determine whether the conflict is between piezoelectric elements on one actuator bank or piezoelectric elements essentially directly electrically connected to one another on at least one side. If there is a conflict between piezoelectric elements on one actuator bank or between piezoelectric elements that are essentially directly electrically connected to one another on at least one side, step 1015, in which the injection duration of the injection having the lower priority is shortened, is carried out. Shortening of this kind also includes shortening to a duration of 0, i.e., elimination of the injection in question. Step 1015 is followed by query 1011.

By contrast, if the conflict is not between piezoelectric elements on one actuator bank or between piezoelectric elements that are essentially directly electrically connected to one another on at least one side, but rather is a conflict between piezoelectric elements on different actuator banks and, respectively, piezoelectric elements to which a single supply unit for charging/discharging is assigned, then query 1014 is followed by step 1016. In step 1016, the injection having the lower priority is delayed, although its duration remains unchanged. Step 1016 is followed by query 1017, in which a check is performed to determine whether there is a conflict. If there is still a conflict, the duration of the injection having the lower priority is shortened. Step 1018 is followed by query 1019. If query 1017 indicates that there is no longer a conflict, query 1019 is carried out immediately thereafter. In query 1019, a check is performed to determine whether pilot injection VE2 has been shifted. If so, in step 1020 pilot injection VE1 is also delayed in such a way that the relative spacing in time of pilot injections VE1, VE2 and main injection HE remains unchanged. Step 1020 is followed by query 1011. If pilot injection VE1 has not been shifted, query 1019 is followed by query 1011.

What is claimed is:

1. A fuel injection system for an internal combustion engine, in particular a diesel engine, having at least two cylinders, the fuel injection system having at least two actuator elements and at least one actuator element being assigned to each cylinder in order to inject fuel into the cylinder, wherein the fuel injection system has an injection control system for monitoring and/or resolving a conflict in triggering of the actuator elements.

2. The fuel injection system according to claim 1,
   wherein the actuator elements are piezoelectric elements.

3. The fuel injection system according to claim 1,
   wherein the actuator elements are solenoid valves.

4. A fuel injection system for an internal combustion engine, in particular a diesel engine, having at least two cylinders, the fuel injection system having at least two piezoelectric elements and at least one piezoelectric element being assigned to each cylinder in order to inject fuel into the cylinder via charging or discharging of the piezoelectric element, and the piezoelectric elements being essentially directly electrically connected to one another on at least one side, wherein the fuel injection system has an injection control system for monitoring whether a piezoelectric element is charged if the other piezoelectric element is to be charged or discharged.

5. A fuel injection system for an internal combustion engine, in particular a diesel engine, having at least two cylinders, the fuel injection system having at least two piezoelectric elements and at least one piezoelectric element being assigned to each cylinder in order to inject fuel into the cylinder via charging or discharging of the piezoelectric element, and a single supply unit for charging or discharging the piezoelectric element being assigned to the piezoelectric elements, wherein the fuel injection system has an injection control system for monitoring possible overlap of a time interval during which one piezoelectric element is to be charged or discharged with a time interval during which the other piezoelectric element is to be charged or discharged.

6. The fuel injection system according to claim 5,
   wherein the fuel injection system monitors whether a piezoelectric element is charged if the other piezoelectric element is to be charged or discharged if the piezoelectric elements are essentially directly electrically connected to one another on at least one side.

7. The fuel injection system according to claim 5, injection of fuel in an injection cycle being carried out via at least two injections, wherein different priorities are assigned to the at least two injections.

8. The fuel injection system according to claim 5, injection of fuel being carried out via a main injection and at least one pilot injection prior to the main injection, more fuel being injected into the cylinder via the main injection than via the pilot injection, wherein a higher priority is assigned to the main injection than to the pilot injection.

9. The fuel injection system according to claim 8, injection of fuel being carried out via a main injection and two pilot injections prior to the main injection,
wherein different priorities are assigned to the pilot injections.

10. The fuel injection system according to claim 5, injection of fuel being carried out via at least one main injection and one secondary injection following the main injection, more fuel being injected into the cylinder via the main injection than via the secondary injection, wherein a higher priority is assigned to the main injection than to the secondary injection.

11. The fuel injection system according to claim 10,
wherein the priority assigned to the pilot injection differs from that assigned to the secondary injection.

12. The fuel injection system according to claim 7, wherein the injection control system shortens the injection having the lower priority to such an extent that one piezoelectric element is not charged if the other piezoelectric element is to be charged or discharged; or no current flows through one solenoid valve if current is flowing through the other solenoid valve.

13. The fuel injection system according to claim 7, wherein the injection control system shifts the injection having the lower priority to such an extent that the time interval during which one piezoelectric element is to be charged or discharged does not overlap with the time interval during which the other piezoelectric element is to be charged or discharged.

14. The fuel injection system according to claim 7, wherein the injection control system delays the injection having the lower priority to such an extent that the time interval during which one piezoelectric element is to be charged or discharged does not overlap with the time interval during which the other piezoelectric element is to be charged or discharged.

15. The fuel injection system according to claim 5, wherein the injection control system shortens the injection having the lower priority to such an extent that the time interval during which one piezoelectric element is to be charged or discharged does not overlap with the time interval during which the other piezoelectric element is to be charged or discharged.

16. The fuel injection system according to claim 14, wherein the injection control system delays the earlier pilot injection by the same amount of time as it does the later pilot injection.

17. A method for operating a fuel injection system for an internal combustion engine having at least two cylinders, the fuel injection system having at least two actuator elements, and at least one actuator element being assigned to each cylinder in order to inject fuel into the cylinder, wherein possible conflicts in triggering of the actuator elements are monitored and/or resolved.

18. A method for operating a fuel injection system for an internal combustion engine having at least two cylinders, the fuel injection system having at least two piezoelectric elements and at least one piezoelectric element being assigned to each cylinder in order to inject fuel into the cylinder via charging or discharging of the piezoelectric element, and the piezoelectric elements being essentially directly electrically connected to one another on at least one side wherein monitoring is carried out to determine whether one piezoelectric element is charged if the other piezoelectric element is to be charged or discharged.

19. A method for operating a fuel injection system for an internal combustion engine having at least two cylinders, the fuel injection system having at least two piezoelectric elements and at least one piezoelectric element being assigned to each cylinder in order to inject fuel into the cylinder via charging or discharging of the piezoelectric element, and a single supply unit for charging or discharging the piezoelectric element being assigned to the piezoelectric elements, wherein monitoring is carried out to determine whether a time interval, during which one piezoelectric element is to be charged or discharged overlaps with a time interval during which the other piezoelectric element is to be charged or discharged.

20. A fuel injection system for an internal combustion engine, comprising:
at least two cylinders;
at least two actuator elements configured to inject fuel into the cylinders, at least one actuator element assigned to each cylinder; and
an injection control system configured to at least one of monitor and resolve a conflict in triggering of the actuator elements.

21. The fuel injection system according to claim 20, wherein the internal combustion engine includes a diesel engine.

22. The fuel injection system according to claim 20, wherein the actuator [] elements include piezoelectric elements.

23. The fuel injection system according to claim 20, wherein the actuator elements include solenoid valves.

24. A fuel injection system for an internal combustion engine, comprising:
at least two cylinders;
at least two piezoelectric elements configured to inject fuel into the cylinders in accordance with a charging or a discharging of the piezoelectric elements, at least one piezoelectric element assigned to each cylinder;
a direct electrical connection between the piezoelectric elements on at least one side; and
an injection control system configured to monitor the charge of a first piezoelectric element if a second piezoelectric element is to be one of charged and discharged.

25. The fuel injection system according to claim 24, wherein the internal combustion engine includes a diesel engine.

26. A fuel injection system for an internal combustion engine, comprising:
at least two cylinders;
at least two piezoelectric elements configured to inject fuel into the cylinders in accordance with one of a charging and a discharging of the piezoelectric elements, at least one piezoelectric element assigned to each cylinder;
a single supply unit assigned to the piezoelectric elements, the single supply unit configured to charge and discharge the piezoelectric elements; and
an injection control system configured to monitor an overlap of a first time interval with a second time interval, the first time interval corresponding to time during which a first piezoelectric element is to be one of charged and discharged and the second time interval corresponding to the time during which a second piezoelectric element is to be one of charged and discharged.

27. The fuel injection system according to claim 26, wherein the internal combustion engine includes a diesel engine.

28. The fuel injection system according to claim 26, wherein the injection control system is further configured to monitor the charge of a first piezoelectric element if a second piezoelectric element is to be one of charged and discharged, the piezoelectric elements configured to be directly electrically coupled to one another on at least one side.

29. The fuel injection system according to claim 26, further comprising an injection cycle including at least two injections, a different priority assigned to each of the injections.

30. The fuel injection system according to claim 29, wherein the injection cycle includes a main injection and at least one pilot injection prior to the main injection, the main injection configured to inject more fuel into the cylinder than the pilot injection, a higher priority assigned to the main injection than to the pilot injection.

31. The fuel injection system according to claim 29, wherein the injection cycle includes a main injection and two pilot injections prior to the main injection, different priorities assigned to each of the pilot injections.

32. The fuel injection system according to claim 29, wherein the injection cycle includes at least one main injection and one secondary injection following the main injection, the main injection configured to inject more fuel into the cylinder than the secondary injection, a first priority assigned to the main injection and a second priority assigned to the secondary injection.

33. The fuel injection system according to claim 32, wherein the priority assigned to the pilot injection differs from the priority assigned to the secondary injection.

34. The fuel injection system according to claim 32, wherein the priority assigned to the pilot injection is higher than the priority assigned to the secondary injection.

35. The fuel injection system according to claim 29, wherein the injection control system is configured to shorten a first injection having a lower priority than a second injection so that a first piezoelectric element is not charged if a second piezoelectric element is to be one of charged and discharged.

36. The fuel injection system according to claim 29, wherein the actuator elements include solenoid valves, the injection control system configured to shorten a first injection having a lower priority than a second injection so that no current flows through a first solenoid valve if current is flowing through a second solenoid valve.

37. The fuel injection system according to claim 29, wherein the injection control system is configured to shift a first injection having a lower priority than a second injection so that the time interval during which a first piezoelectric element is to be one of charged and discharged does not overlap with the time interval during which a second piezoelectric element is to be one of charged and discharged.

38. The fuel injection system according to claim 29, wherein the injection control system is configured to delay a first injection having a lower priority than a second injection so that the time interval during which a first piezoelectric element is to be one of charged and discharged does not overlap with the time interval during which a second piezoelectric element is to be one of charged and discharged.

39. The fuel injection system according to claim 26, wherein the injection control system is configured to shorten a first injection having a lower priority than a second injection so that the time interval during which a first piezoelectric element is to be one of charged and discharged does not overlap with the time interval during which a second piezoelectric element is to be one of charged and discharged.

40. The fuel injection system according to claim 30, wherein the injection control system is configured to delay an earlier pilot injection by the same amount of time as a later pilot injection.

41. A method for operating a fuel injection system for an internal combustion engine, comprising:
monitoring and resolving conflicts in triggering a plurality of actuator elements by an injection control system, the actuator elements configured to inject fuel into at least two cylinders, one actuator element assigned to each of the at least two cylinders.

42. A method for operating a fuel injection system for an internal combustion engine, comprising:
directly electrically coupling two piezoelectric elements on at least one side, a piezoelectric element assigned to a cylinder and configured to inject fuel into the cylinder in accordance with one of a charging and a discharging of the piezoelectric element; and
monitoring the charge of a first piezoelectric element if a second piezoelectric element is to be one of charged and discharged.

43. A method for operating a fuel injection system for an internal combustion engine, comprising:
monitoring to determine whether a first time interval, during which a first piezoelectric element is to be one of charged and discharged overlaps with a second time interval during which a second piezoelectric element is to be one of charged and discharged, at least one piezoelectric element assigned to each of at least two cylinders, the piezoelectric elements configured to inject fuel into the cylinders in accordance with one of a charging and a discharging of the piezoelectric elements, a single supply unit configured to charge or discharge the piezoelectric elements assigned to the piezoelectric elements.

* * * * *

UNITED STATES PATENT AND TRADEMARK OFFICE
CERTIFICATE OF CORRECTION

PATENT NO. : 6,564,771 B2  Page 1 of 1
DATED : May 20, 2003
INVENTOR(S) : Rueger et al.

It is certified that error appears in the above-identified patent and that said Letters Patent is hereby corrected as shown below:

<u>Column 14,</u>
Line 26, change "actuator [ ] elements" to -- actuator elements --

Signed and Sealed this

Fifteenth Day of June, 2004

JON W. DUDAS
*Acting Director of the United States Patent and Trademark Office*